July 24, 1923.

G. E. VINNEDGE

RESILIENT WHEEL

Filed Sept. 25, 1922

1,462,891

Geo. E. Vinnedge
INVENTOR

Patented July 24, 1923.

1,462,891

UNITED STATES PATENT OFFICE.

GEORGE E. VINNEDGE, OF PORTLAND, OREGON.

RESILIENT WHEEL.

Application filed September 25, 1922. Serial No. 590,534.

*To all whom it may concern:*

Be it known that I, GEORGE E. VINNEDGE, a citizen of the United States of America, residing at Portland, in the county of Multnomah and the State of Oregon, have invented new and useful Improvements in Resilient Wheels, of which the following is a specification.

This invention relates to a vehicle wheel of a type which is adapted to function as a shock-absorbing medium independently of the tire.

An object of the invention is to provide a resilient wheel in which the resilient elements will be of simple form and construction, will operate efficiently under all circumstances and continue to do so during an extended period of time.

Another object of the invention is to provide a resilient wheel which may be assembled and disassembled readily, and upon which the tire may be placed and from which it may be removed when desired without difficulty.

Another object of the invention is to provide a resilient wheel in which the degree of resiliency is limited only by the number of the resilient members employed.

Other objects and advantages of the invention will appear as the following description is read in connection with the accompany drawings.

In the drawings:—

Figure 1:
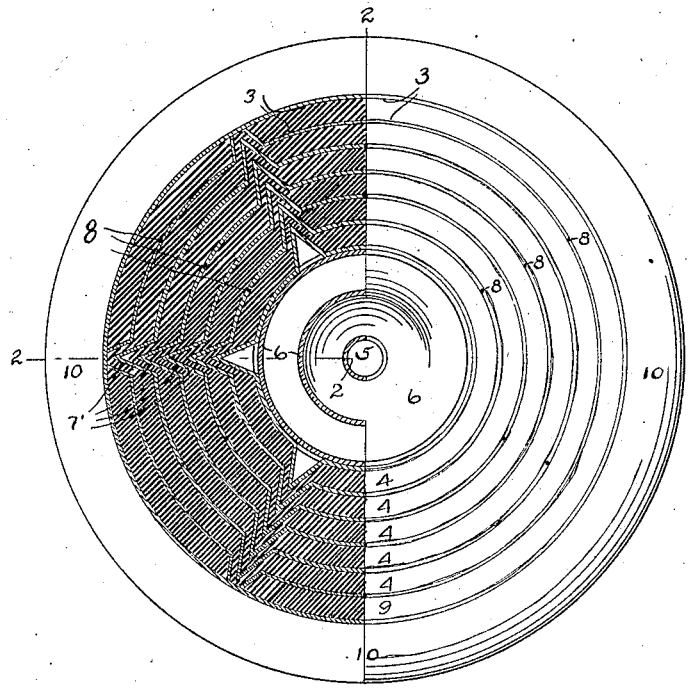
Figure 1 is a side elevation of the wheel of my invention, with a section taken on line 1—1 of Figure 2 removed to show the arrangement of the resilient elements.

Referring specifically to the drawings, wherein like characters denote corresponding parts, the invention as shown includes a central bore 5, in which the usual bearing member may be inserted in the center of a metal disk hub member 6. Spaced outwardly from the disk hub member and concentrically disposed with respect thereto are a plurality of alternate metal bands 3 and resilient separators 4, interlocked and held in spaced relation by their constructional form. An outer band or felloe 9 encircles the assembly of the resilient members, upon which is mounted a tire 10, preferably of resilient material.

The periphery of the disk hub 6 has a plurality of projections 7'' formed integral with it and extending radially outward.

Upon the hub 6 are mounted a plurality of metal bands 3, each having projections 7 formed integral with it and corresponding radially with those on the hub 6.

Between the hub 6 and the first band 3, and also between each concentric band 3 is a separator 4 of resilient material shaped in annular form with projections 7' similar to those upon the bands 3 and fitting closely thereto when placed in position in the assembled wheel.

Each band 3 is so constructed that either by means of a plurality of hinges 8 or by other division it may readily be positioned over and encircling the next smaller member when assembling the wheel.

Figure 2:
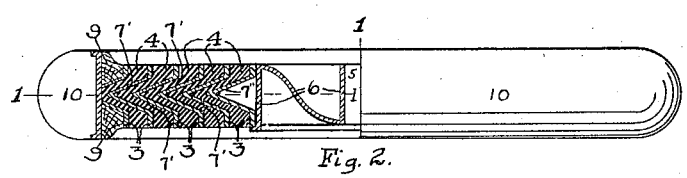
Figure 2 is a view of the wheel turned edgewise, with a section taken on line 2—2 of Figure 1 removed to further show the arrangement of the resilient members.
Figure 3:
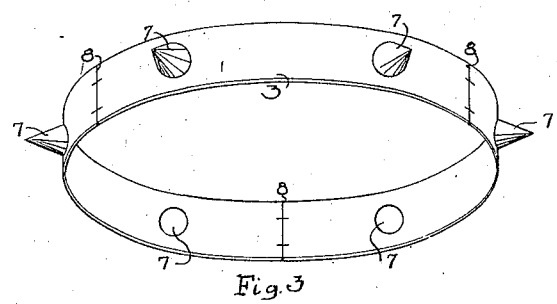
Figure 3 is a perspective view of a typical annular member 3, separated from its adjacent members 4.

The projections 7 on bands 3, 7' on separators 4, and 7'' on the hub 6, are so proportioned that when in position in the assembled wheel those on each smaller member extend through the ring or band of the adjacent larger member and into the corresponding projection thereon as shown in Figures 1 and 2, forming an interlocked assembly, each metal member being separated from any other metal member by the resilient separators 4.

By constructing the wheel as explained in the foregoing description a sturdy structure is produced, presenting a pleasing appearance and at the same time the various parts may be readily assembled and disassembled and the tire may be readily put on or removed. With the arrangement of concentric bands each separated from the other metallic members of the wheel by the resilient separators, it is apparent that the portions of the bands in proximity to the portion of the tire which happens to be resting upon the ground will be pressed inwardly against their corresponding resilient separators, thereby increasing the shock-absorbing qualities of the wheel.

The invention is susceptible of various changes in its form, proportions and minor details of construction and the right is herein reserved to make such changes as properly fall within the scope of the appended claims.

Having described the invention, what is claimed is:

1. A vehicle wheel comprising a disk hub provided with a central bore for the insertion of a bearing, the disk having mounted upon its periphery a plurality of concentrically disposed metal bands, separated from each other by resilient bands of similar form, and interlocked into relative position with each other by means of a plurality of radial projections substantially as shown and described, and an outer band or felloe also interlocked into relative position by means of depressions into which fit the radial projections of the outermost metal band and resilient separator, and carrying upon its outer face a tire.

2. A vehicle wheel comprising a disk hub member provided upon its periphery with a plurality of radial projections integral with it and having mounted thereon and interlocked in position by means of said projections a plurality of concentric metal bands having similar radial projections integral with them, the said bands alternating with a corresponding number of resilient bands acting as separators between said metal bands, an outer band or felloe provided upon its inner surface with a plurality of depressions corresponding with the number of projections upon the bands and fitting closely over the outer separator band of resilient material and interlocked thereon, and upon its outer face a tire.

3. A vehicle wheel comprising a hub member upon which is mounted a laminated assembly of alternate metal and resilient bands, each provided with similar hollow projections so proportioned that those projections on each smaller annular member extend through the band and into the cavity of the corresponding projection of the adjacent larger member, the assembly encircled by a rim or felloe upon which is mounted a tire, all substantially as shown and described.

4. A vehicle wheel comprising a disk hub member with radial projections integrally a part thereof, and mounted thereon and interlocked in position a plurality of metal bands with similar projections alternating with a corresponding number of resilient bands of similar form, each metal band being separated from other metal bands by said resilient bands, forming a series of resilient cushions between the hub member and the outer band or felloe.

5. A resilient wheel comprising a hub member and mounted thereon an assembly of alternate resilient and metal bands interlocked into relative concentricity by means of a plurality of hollow projections integral with said bands, each projection extending through the next adjacent band and into the cavity of the corresponding projection thereon, a rim or felloe encircling the assembly and carrying upon its periphery a tire.

In testimony whereof I affix my signature.

GEORGE E. VINNEDGE.